March 4, 1941.	H. B. LEACH	2,233,618
SAFETY WELDING ELECTRODE HOLDER
Filed Jan. 6, 1940.
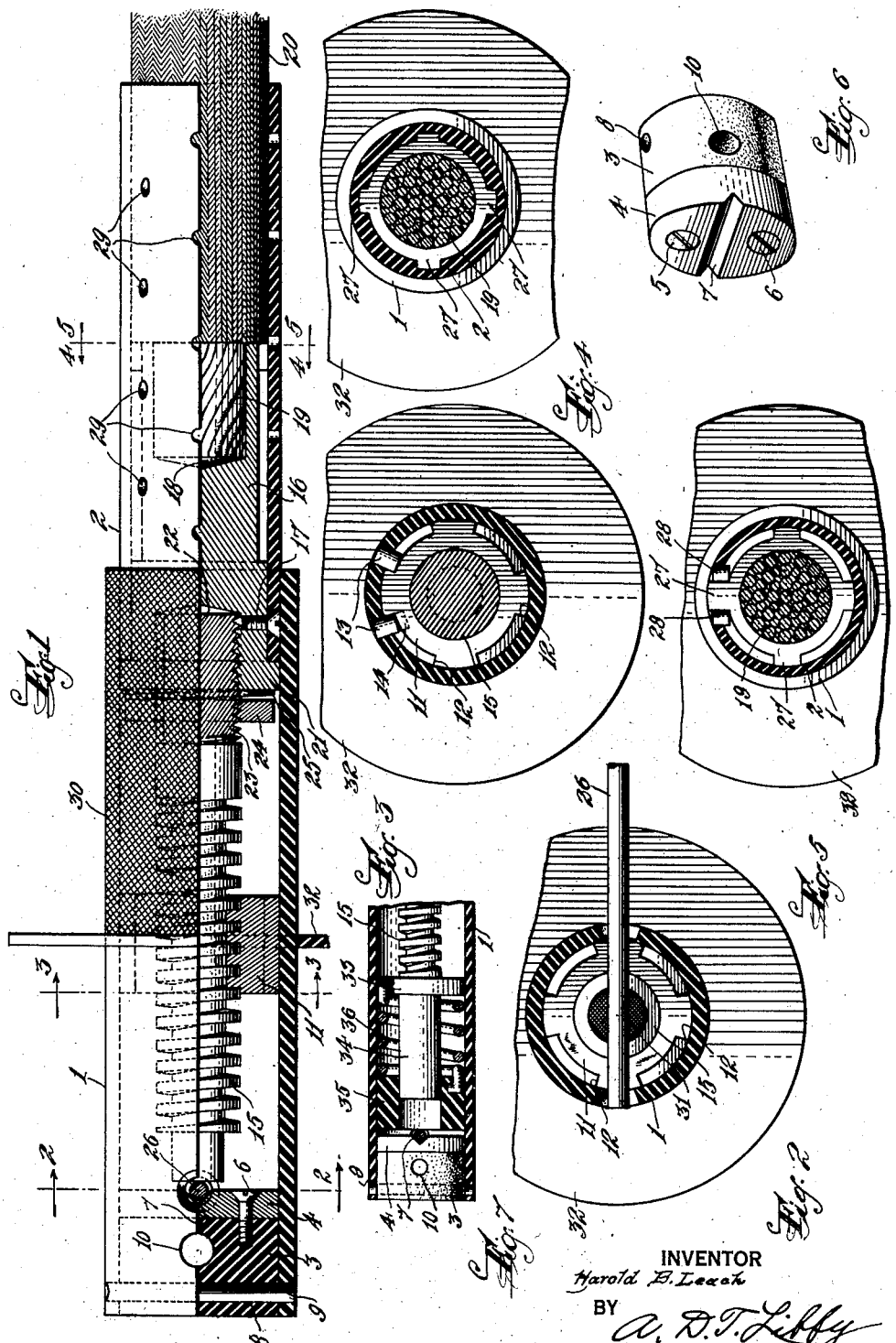
INVENTOR
Harold B. Leach
BY
ATTORNEY Patented Mar. 4, 1941

2,233,618

UNITED STATES PATENT OFFICE 2,233,618

SAFETY WELDING ELECTRODE HOLDER

Harold B. Leach, Chicago, Ill., assignor to Electric Arc Cutting & Welding Company, Newark, N. J., a corporation of New Jersey Application January 6, 1940, Serial No. 312,631

11 Claims. (Cl. 219—8)

This invention relates to improvements in an arc welding electrode holder of the type which utilizes a metallic electrode.

In metallic arc-welding, one side of the current supply is brought to the electrode holder, and the other side, usually termed the ground side, is connected to the work or piece to be welded. Practically all the electrode holders heretofore made for this work have the portions, which grip the electrode, exposed so that if the operator, after using up an electrode, should forgetfully lay the welding handle or tongs down on or against the work, a short circuit will be produced across the welding machine, or an arc will be started at the tool itself, all of which is injurious to either piece of apparatus. For certain work, the operator may raise the voltage on the welding machine or use a higher source than the arc-welding voltage now adopted as standard, in which case the troubles above mentioned are considerably amplified. In addition, the operator may get a shock when inserting a new electrode into the holder, especially if a bare electrode is being used, even through the operator may be wearing gloves, as usually his hands are sweaty and the gloves are moistened thereby. While, at the present time, covered electrodes are substantially standard for metallic arc-welding and these coverings are of insulating material to a large extent, there is still a chance, even though it may be small, of the operator getting a shock when inserting a new electrode into the usual type of holder, as has been previously stated. While some attempt has been made to overcome these difficulties, I know of no handle but what some part of it has some live metal part exposed to which the supply circuit is connected.

It is therefore the object of my present invention to provide a safety welding electrode holder which will entirely and absolutely eliminate any trouble produced by the operator laying the handle down on the work or the operator getting a shock when inserting the electrodes in the holder.

Another object of my invention is to produce a welding electrode holder which will attain the principal result and at the same time provide a construction which is relatively cheap to manufacture and one which is easy and convenient for the operator to handle during the welding operations.

My invention will be readily understood by reference to the annexed drawing, wherein:

Figure 1 is a view of my improved type of electrode holder, partly in section and partly in elevation.

Figure 2 is a view on the line 2—2 of Figure 1.
Figure 3 is a view on the line 3—3 of Figure 1.
Figure 4 is a view on the line 4—4 of Figure 1.
Figure 5 is a view on the line 5—5 of Figure 1.
Figure 6 is a perspective view of the fixed contact plug removed from the holder.
Figure 7 is a view partly in section and partly in elevation of a modified construction of the electrode end of the holder.

In the various views, 1 and 2 illustrate a pair of telescopic tubes of suitable insulating material, such as horn fibre, as the tubes must be strong and able to withstand considerable abuse, as the ordinary welder is none to careful in the manner in which he handles an electrode holder. Positioned within the outer or free end of the tube 1, is a plug 3, also of strong insulating material such as horn fibre. Fastened to the inner face of the plug 3 is a circular disc 4 of suitable metal, the same being fastened to the plug 3 by screws 5 and 6 which are flush or at least do not project beyond the inner face of the disc 4. The disc 4 has a transverse groove 7 therein to position the end of a welding electrode. The plug 3 is provided with a cross-bore or hole 8 which is adapted to receive a pin 9 which may be of metal since it is embedded in the insulating material of the plug 3. The plug 3 is also provided with a transverse hole 10, the purpose of which will be hereinafter explained.

Positioned within the inner wall of the tube 1, and a considerable distance from both ends of the tube, is a guide and support member 11 which has a plurality of keys 12, four being shown in Figure 3. Preferably, the member 11 is forced, under considerable pressure, into the tube 1, but if any additional holding means is required to prevent the member 11 from turning therein, plugs 13 of horn fibre or rawhide, or equivalent insulating material, may be positioned in the tube 1 and in cooperative relation with one or more of the keys, somewhat as indicated in Figure 3. If necessary, the plug 13 may continue into a hole indicated by the dotted line 14 so as to prevent any longitudinal movement of the member 11 within the tube 1.

The member 11 has an internal thread to receive the threaded extension 15 of a metal member 16 which is positioned in the tube 2 which is fastened to the member 16 in any satisfactory manner as by one or more screws 17, the heads of which are flush or do not project beyond the outer wall of the tube 2, so as to allow this tube to move within the tube 1. The outer end of the member 16 has a counterbore or hole 18 therein to receive the bared end 19 of an electric current conducting cable 20 which extends a considerable distance within the tube 2, the bared end 19 being soldered into the socket or hole 18 in the member 16.

As shown in Figure 1, the member 16 has a flange 21 against which the end of the tube 2 abuts. This end of the member 16 is shown with a threaded hole 22 therein to receive the threaded end 23 of the extension 15. When the members 15 and 16 are made in two parts, the threaded end 23 is screwed into the hole 22 so that it securely locks against the inner end of the hole, and then a nut 24 carried on the thread 23 is turned securely against the flange 21 or against the lock washer 25.

As shown in Figure 1, the extension 15 is shown as provided with a square thread, but any other type of thread, such as shown at 23, may be used. Furthermore, this clamping jaw, which I term the movable one, can be made of one piece of metal, preferably of hard copper or bronze, so as to get a good current-conducting circuit clear through the electrode 26. The cable end of the member 16 is provided with a plurality of keys 27, similar to the member 11, and plugs 28 of strong insulating material may be used in connection with these keys, as shown in Figure 5, for anchoring the member 16 to the tube 2 in place of the screws 17, or both the screws 17 and plugs 28 may be used.

The member 2 is preferably provided with a plurality of holes or perforations 29 for cooling the handle part of the holder. The tube 1 is also preferably provided with a roughened or knurled portion 30 to provide a hand-grip whereby the operator may take hold of this grip portion with one hand, and with the other hand under the tube 2, cause to bring about a relative rotation between the two through the threaded extension 15 and the guide and support member 11. By holding the member 1 through the grip portion 30 and turning the member 2, the electrode 26 may be securely clamped in position and by reverse direction of rotation, the end of the electrode, after the main part has been used up, may be dropped out of the holder by backing off the movable jaw. It may be noted that the end of the movable jaw which grips the cable 26 has serrations 31 for better gripping the electrode. Also, the tube 1 is provided with a guard disc 32 made of strong insulating material such as horn fibre.

From the above it will be seen that there are absolutely no metal parts of the holder which are connected to the cable 20, that are exposed in any manner, and the holder may be laid down promiscuously, even when it is provided with no guard 32, without short-circuiting the welding machine or starting an arc between the handle and the work and, as previously mentioned, the stub end of the electrode which remains in the holder after the main part has been used up in the arc, may be released and dropped out of the holder without coming in contact with the electrode. Since, as previously stated, practically all metallic welding electrodes today are covered with a flux or slag coating which is insulating in character, an electrode may be put into the holder without any danger of the operator receiving a shock, but to take care of a case where a voltage higher than standard is used, or any other condition, the construction of Figure 7 may be used.

In Figure 7 the electrode-engaging end of the movable jaw has a flange 33 and a further extension 34 that normally projects a distance into a ring or collar 35 of insulating material. Between the flange 33 and the ring 35 is positioned a spring 36, one end of the spring being fastened to the flange 33 and the other end to the ring 35. With this construction, when the operator desires to clamp an electrode in the holder, the electrode is inserted in the hole provided, and the tube 2 turned. This starts to move the insulating ring 35 against the spring 36 and this will force the ring 35 against the electrode sufficiently to hold it initially in place. Further continued turning of the tube 2 will compress the spring 36 sufficiently to cause the end 34 of the movable electrode to project through the ring 35 into engagement with the electrode, this last operation being performed by the operator having one of his hands on the grip portion 30 of the tube 1 and the other hand on the tube 2. Thus when the movable jaw end engages the electrode, the operator has both hands on the insulating tubes comprising the holder.

Removing the stub end of the electrode is done the same as heretofore described with respect to Figure 1; i. e., when the end 34 is moved to retracted position, the spring 36 will bring the insulating ring 35 back sufficiently to clear the electrode and allow it to drop out of the holder.

As will be noted in Figures 1 to 6, the plug 3 is provided with a hole 10 which continues through the tube 1 and this may be used for inserting a rod for turning the tube 1 or holding it while the tube 2 is turned, or the two may turn simultaneously in reverse directions. The use of the rod in the hole 10 is an alternative form for the grip 30.

The details entering into the construction of my improved handle may be changed without departing from the spirit of my invention or the scope of the appended claims.

What I claim is:
1. A safety welding electrode holder including a pair of telescopic tubes of suitable insulating material, a metallic contact member positioned within one end of the larger diameter tube, a threaded guide and support member located within said larger tube, a supply cable terminal positioned within the tube of smaller diameter and fastened thereto, a threaded extension of said cable terminal extending through said guide member, the free end of said extension cooperating with said metallic contact to grip an electrode inserted between them, the tube of larger diameter having a transverse hole therethrough to receive an electrode in cooperative position with the gripping part of said contact member when the two tubes are caused to have relative rotation in the proper direction therebetween through the cooperative action between the threaded element and the threaded guide member.

2. A safety welding electrode holder including a pair of relatively rotatable telescopic tubes of suitable insulating material, a plug of insulating material fastened in the end of the outer tube, a metallic contact carried on the inner end of said plug, a threaded guide and support member located within the outer tube, a supply cable terminal positioned within the inner tube and fastened thereto, the cable terminal having a threaded extension going through said guide and support member, the free end of said extension acting to press an electrode against said plug contact when the tubes are relatively rotated in the proper direction, the outer tube having a hole therein to receive an electrode in cooperative relation to said plug contact.

3. A safety welding electrode holder as set forth in claim 2, characterized in that said plug may be forced out of the outer tube after its fastening means is removed, by rotating the inner tube sufficiently to move said threaded extension beyond its normal gripping position against the plug.

4. A safety welding electrode holder including parts for completely concealing all the metal parts carrying the welding current, said parts comprising two elongated tubes of insulating material, one smaller than the other and adapted to move with its full diameter within the larger but having one end protruding therefrom, a cable terminal located a distance within the protruding end of the smaller tube and having a threaded extension projecting into the larger tube, a guide and support member within the larger tube and having threads to receive said extension element, a plug insulator fastened in the outer end of the larger tube, a fixed metal contact carried by said plug, said larger tube having a transverse hole to receive an electrode between said contact and the end of said extension, the gripping action being brought about by causing relative turning between the two tubes.

5. A safety welding electrode holder including parts for completely concealing all the metal parts carrying the welding current, said parts comprising two tubes of insulating material and telescopically arranged, means within the inner tube to receive a current-carrying cable, a threaded extension of said means, a guide and support member within the outer tube and threaded to receive said threaded extension, a fixed metallic contact fastened to and concealed within the free end of the outer tube for co-operation with the end of said threaded extension for gripping an electrode, the outer tube having a transverse hole therein to receive the electrode.

6. An electrode holder as defined in claim 4, further characterized in that said fixed contact is a metal disc fastened to the end face of the insulating plug, the plug being removable by screwing the end of said threaded extension against the disc after removal of the plug-fastening means.

7. A safety welding electrode holder including a pair of insulating tubes, one normally projecting a distance within the other, an internally threaded guide and support member fixed within the outer tube at a predetermined distance from its ends, a metal contact carried in the free end of the outer tube, an elongated metal member housed within the tubes and anchored to the inner tube, said elongated member being threaded for a considerable length from one end, the threaded end fitting in the threaded guide and support member, while its opposite end is adapted to receive a current-conducting cable, the outer tube having a hole therein in operative relation to said metal contact to receive an electrode, the electrode being gripped between the contact and end of the elongated member on causing relative rotation in the proper direction between the tubes.

8. A safety welding electrode holder as defined in claim 7, further characterized in that means are provided between the end of said elongated member and the metal contact to prevent a user of the handle from getting a shock from the electric current even if the user uses a bare electrode and no gloves on his hands when putting the electrode into the holder.

9. A safety welding electrode holder as defined in claim 7, further characterized in that an insulator is slidably located within the outer tube between the end of the elongated member and the electrode hole, the insulator being connected to the elongated member by a spring and carrying a metal plunger with means for holding the plunger so it will not contact with the electrode until after the insulator engages the electrode through pressure of said spring applied by the elongated member.

10. A safety welding electrode handle, including a pair of completely telescopic tubes of suitable insulating material, fixed and movable jaws carried within said tubes for gripping an electrode the greater portion of the length of the jaw carried by the inner tube lying within the confines of the outer tube, means for supplying current to one of said jaws, and means within the tubes for producing relative rotation between the tubes, when manual forces are applied to the exterior of the tubes, to bring the jaws into gripping position with an electrode.

11. A safety welding electrode handle, including a pair of telescopic tubes of suitable insulating material, a fixed jaw carried at one end of the outer tube and terminating in a single transverse plane a movable jaw fastened to the inner tube and extending for the greater portion of its length within the outer tube, means for supplying current to the movable jaw, and means part of which are carried directly by the outer tube for producing relative rotation between the tubes, when manual forces are applied to the exterior of the tubes, to bring the jaws into gripping position with an electrode.

HAROLD B. LEACH.